United States Patent Office 3,406,549
Patented Oct. 22, 1968

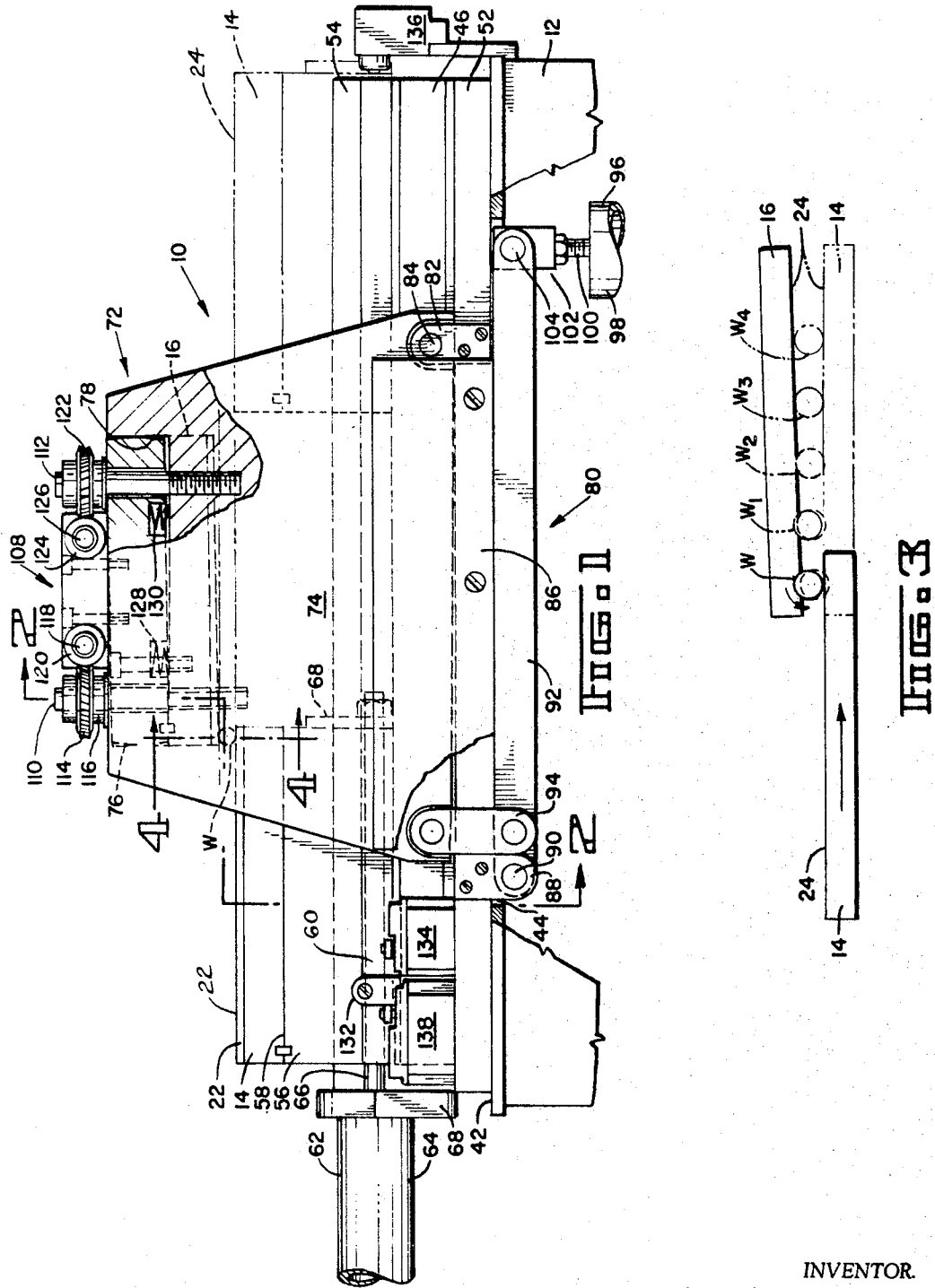

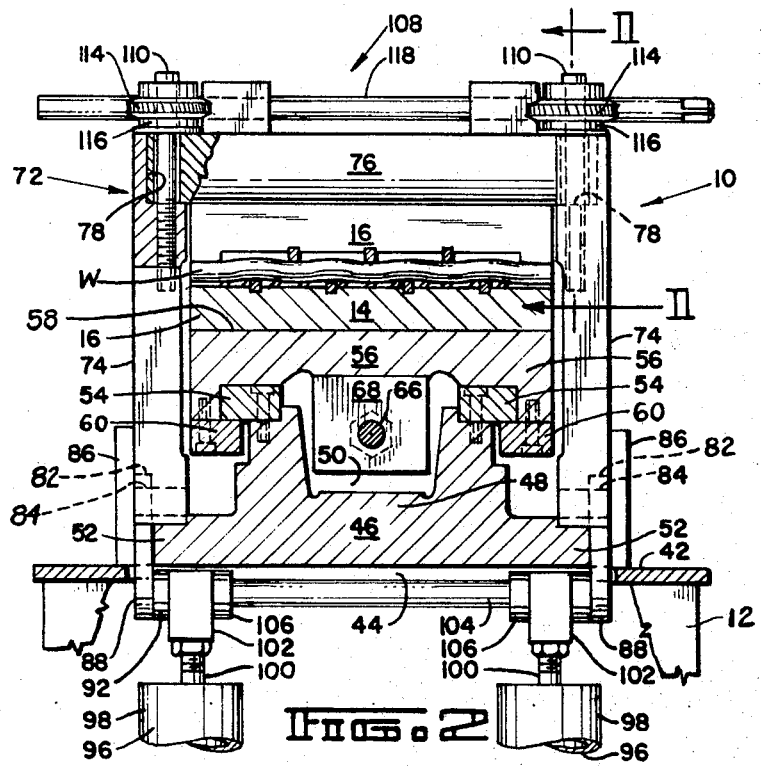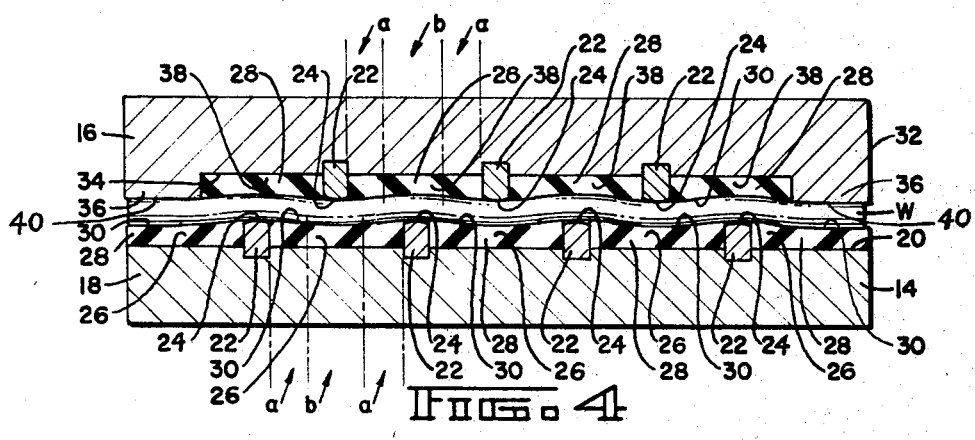

3,406,549
STRAIGHTENING MACHINE
John H. Rohlfs, Sr., Torrington, Conn., assignor to The Turner and Seymour Manufacturing Company, Torrington, Conn., a corporation of Connecticut
Filed Apr. 28, 1966, Ser. No. 545,904
12 Claims. (Cl. 72—88)

This invention relates to a machine for straightening elongated workpieces of generally circular cross section.

The general object of the present invention is to provide a machine of the aforedescribed character wherein an elongated workpiece is straightened by simultaneously selectively bending and rotating it generally about its axis.

Another object of the invention is to provide a straightening machine which subjects a workpiece to minimal stress in effecting straightening thereof.

A further object of the invention is to provide a straightening machine which may be rapidly and accurately adjusted by a relatively unskilled operator to effect precision straightening of a workpiece.

Other objects and advantages of the invention will be apparent from the following description and from the drawings forming a part thereof.

The drawings show a preferred embodiment of the invention and such embodiment will be described, but it will be understood that various changes may be made from the construction disclosed, and that the drawings and description are not to be construed as defining or limiting the scope of the invention, the claims forming a part of this specification being relied upon for that purpose.

Of the drawings:

FIG. 1 is a fragmentary side elevational view of a machine embodying the present invention taken partly in section along the line 1—1 of FIG. 2.

FIG. 2 is a vertical sectional view of the machine of FIG. 1 taken generally along the line 2—2 of FIG. 1.

FIG. 3 is a somewhat schematic view of the upper and lower tools of the machine of FIG. 1 and shows a workpiece in a first position therebetween, the upper tool being shown in an inclined position relative to the lower tool.

FIG. 4 is a somewhat enlarged sectional view through the tools taken along the line 4—4 of FIG. 1 and shows a workpiece therebetween in a first or bent position.

Generally, the present invention contemplates a machine comprising a first tool which has two elongated parallel and laterally spaced work surfaces which are located substantially in the same plane and which face in the same direction for engaging one side of an elongated workpiece of generally circular cross section. The machine also includes a second tool which has a third elongated work surface which is located laterally between the work surfaces of the first tool and which is spaced from and faces the first tool surfaces so as to engage the generally opposite side of the workpiece. A means is provided for moving one of the tools relative to the other to move the work surfaces in such a manner as to cause the workpiece to roll therealong between a first or bowed position wherein axially spaced portions of the workpiece are relatively radially displaced and a second position wherein the workpiece portions are substantially axially aligned.

In the first position the workpiece is held in a bowed or bent condition between the two work surfaces on the first tool and the third work surface on the second tool. As one tool is moved relative to the other the spacing between the respective tool surfaces is gradually increased so that one of the tools ceases to engage the workpiece when it reaches its second or straightened position.

Referring now to the drawings and more particularly to FIGS. 1 and 2 thereof, a machine embodying the present invention is indicated generally at 10 and is shown to comprise a frame 12 which provides support for a first or lower tool 14 and a second or upper tool 16. The upper and lower tools, which may be interchangeably positioned with respect to the machine frame, are constructed and arranged for movement relative to the frame and to each other in a manner which will be hereinafter described.

The tools may be made in various forms, but preferably the lower tool 14 and the upper tool 16 are generally similar, as best illustrated in FIG. 4, the tools being shown with a workpiece W therebetween in a first or bent position.

The lower tool 14 has an elognated generally rectangular base portion 18 which includes a generally horizontally disposed upwardly facing surface 20 and a plurality of elongated parallel and laterally spaced ribs or bars 22, 22 which project upwardly from the surface. The bars 22, 22 and associated portions of the surface 20 define a plurality of longitudinally extending upwardly opening channels 26, 26. Each bar 22 includes an elongated upwardly facing work surface 24 which has a generally convex lateral cross-sectional contour to smoothly arcuately engage an associated portion of the workpiece W in a first position. Although the bars may be integrally formed on the base portion 18, preferably each bar is separately formed and is releasably retained in an associated recess in the base portion. This arrangement facilitates bar removal for reconditioning or replacement to compensate for work surface wear.

To provide additional support for the workpiece W and to aid in the attainment of a bowed or smoothly bent condition in the first position the lower tool 14 includes a plurality of elongated generally rectangular resilient pads 28, 28 each of which is received within and substantially fills an associated channel 26. Each of the pads has a work supporting surface 30 which is located substantially in the plane of the work surfaces 24, 24.

The pads 28, 28 are preferably made from an elastomeric material such as hard rubber and each pad preferably includes longitudinally extending regions of varying hardness, the regions of greatest hardness being proximate the marginal edge portions and adjacent associated bars 22, 22 as indicated generally at $a$, $a$ in FIG. 4. The marginal regions $a$, $a$ may, for example, have a hardness or durometer of 90 whereas the material which comprises the central portion indicated generally at $b$ may be of 80 durometer.

As previously noted the upper tool is generally similar to the lower tool but differs therefrom particularly in the construction and arrangement of its base portion. Specifically, the upper tool 16 has a generally rectangular base portion 32 which includes a downwardly facing substantially flat surface 34 and a pair of laterally spaced longitudinally extending marginal edge portions or ribs 36, 36 which project downwardly from the surface 34. Like the lower tool the upper tool 16 includes a plurality of longitudinally extending bars 22, 22 which are retained within associated recesses in the base portion 32 and which are in all respects similar to the bars 22, 22 of the lower tool.

The upper tool 16 also includes a plurality of generally rectangular longitudinally extending pads 28, 28 which are substantially identical to the pads of the lower tool and which are received within downwardly opening channels 38, 38 defined by the bars 22, 22, the ribs 36, 36, and associated portions of the surface 34. It will be noted that the integrally formed ribs 36, 36 each include a generally downwardly facing elongated work surface 40 which lies substantially in the plane of the work surfaces 24, 24. It will be further noted that the longitudinally extending inner edge of each work surface 40 curves generally arcuately inwardly or toward the center of the tool to effect smooth engagement with a workpiece in the first position.

Means for effecting relative movement between the tool work surfaces may obviously be provided for in various ways. In accordance with the presently preferred practice such relative movement is effected by moving the upper tool 16 to an inclined position relative to the lower tool 14 and thereafter maintaining the upper tool in the inclined position while the lower tool 14 is moved generally longitudinally relative thereto. In FIG. 3 the tools are shown somewhat schematically with a workpiece W in a first position therebetween, the upper tool 16 being shown in the inclined position and the lower tool 14 being shown in its approximate location at the beginning of a straightening cycle or prior to longitudinal movement thereof. At this point it should be noted that the means for inclining the upper tool relative to the lower one also cooperates with the tools to bend the workpiece to the first position.

As the lower tool 14 moves forwardly or to the right along a longitudinally rectilinear path toward a forward position indicated by broken lines, the workpiece W which is in a first position is caused to roll forwardly therealong toward a second position, successive locations of the workpiece being indicated at W, $W_1$, $W_2$, $W_3$ and $W_4$. The portions of the workpiece engaged by the work surfaces 24, 24 are alternately radially displaced to one and the opposite side of the workpiece axis as the workpiece rolls in a forward direction. It will be evident that as the tool 14 progresses along a forward path the space between associated work surfaces 24, 24 at the location of the workpiece gradually increases causing a corresponding decrease in the magnitude of workpiece portion displacement. When the workpiece progresses to a location where the spacing between the tool surfaces is substantially equal to the diameter of the workpiece, as indicated at $W_3$, the workpiece attains its second position wherein the portions are substantially axially aligned. Thereafter, the surfaces 24, 24 on the upper tool cease to engage the workpiece as illustrated at $W_4$. As a result of this operation the workpiece is caused to assume a permanent straight set with a high degree of accuracy.

It is obviously undesirable to subject a workpiece to excessive bending stress to effect straightening thereof, since material fatigue or crystallization may result therefrom. Variable factors such as workpiece diameter and material physical characteristics generally determine the optimum number of workpiece axial revolutions required to effect straightening of a given workpiece with the machine of the present invention; however, generally it has been found that the machine will effectively straighten a workpiece that has made four or fewer revolutions in passing therethrough.

It should now be evident that the number of revolutions made by a given workpiece with respect to the machine will be predetermined by the angular relationship between the work surfaces on the upper and lower tool and it is for this reason that the machine also includes a means for adjusting this angular relationship.

Considering now the structure for supporting the tools 14 and 16 and referring again to FIGS. 1 and 2 it will be seen that the frame 12 which is of a welded construction includes a generally rectangular horizontally disposed upper surface plate 42 which has an elongated generally rectangular opening 44 extending therethrough to accommodate a lever mechanism to be hereinafter described. Supported upon and secured to the upper surface of the plate 42 is a generally rectangular base member 46 which extends longitudinally of the frame 12 above the opening 44 and which in turn provides a base of support for additional structural members which carry the upper and lower tools. The base member 46 has an elongated longitudinally extending generally U-shaped central portion 48 which defines an upwardly opening channel 50 extending longitudinally therethrough. The base member also includes a pair of longitudinally extending base flanges 52, 52 which project laterally outwardly from the central portion 48. Formed in the upper ends of the central portion are a pair of laterally spaced generally L-shape longitudinally extending upwardly and outwardly opening recesses each of which receives an elongated generally rectangular longitudinally extending bearing block or way 54 which is bolted thereon and which projects laterally outwardly therefrom.

Support for the lower tool 14 is provided by a generally rectangular carriage 56 which has a substantially horizontal upper surface 58 and which is arranged for rectilinearly longitudinal movement relative to the frame 12. For this purpose the carriage 56 includes a generally U-shaped downwardly opening channel which extends longitudinally therethrough and which substantially complements and slidably engages the ways 54, 54. The carriage 56 is retained on the ways by a pair of laterally spaced elongated generally rectangular and longitudinally extending gibs 60, 60 each of which is fastened to an associated lower surface of the carriage 56 and which projects inwardly therefrom or toward the center of the machine as viewed in FIG. 2, to engage a lower surface portion of an associated way 54. The lower tool 14 rests upon the surface 58 and is keyed in longitudinal alignment with the carriage and suitably fastened thereto.

Means for moving the lower tool 14 along the longitudinally rectilinear path relative to the machine frame 12 and to the upper tool 16 is provided by a fluid motor or hydraulic cylinder 62 of the double action type which includes a stationary part or cylinder 64 and longitudinally reciprocally movable part or piston rod 66. The cylinder 64 includes a base flange 68 which is suitably fastened to the base member 46 at the rear end or left of the machine as it appears in FIG. 1. The piston rod 66 extends longitudinally into the channel 50 and is bolted at its free end to a connecting plate 70 which is in turn fastened to the forward end of the carriage 56. The hydraulic cylinder 62 is operated by a hydraulic pump (not shown) which is located in the base of the machine and which is preferably electrically controlled in a manner that will be hereinafter further discussed.

The upper tool is carried by an inverted generally U-shaped structure indicated generally at 72 which bridges the lower tool 14 and which generally comprises a pair of laterally spaced longitudinally extending side members 74, 74. Each side member 74 is generally shaped like a frustrated pyramid, as viewed in FIG. 1, and extends generally upwardly in relation to an associated flange 52.

The structure 72 also includes an elongated generally rectangular upper tool support block 76 which extends laterally between the upper ends of the side members 74, 74. Each of the laterally opposite end portions of the block 76 is respectively received in an associated generally complementary inwardly and upwardly opening recess 78 in a side member 74. The block 76 which carries the upper tool 16 on its lower surface is adjustably secured to the side members 74, 74 in a manner which will be hereinafter further described. However, at this point it should be noted that the forwardly and rearwardly facing laterally extending surfaces are generally convex to permit angular movement of the block about a lateral axis and within the recesses 78, 78 for a reason that will be hereinafter evident.

As will be seen the structure 72 forms a part of a mechanism or lever system indicated generally at 80, each of the side members 74 being pivotally connected at its lower and forward end to the base member 46 for limited movement about lateral axis. Pivotal connection is provided by a pair of laterally spaced lugs 82, 82 each of which is fastened to and extends upwardly from an associated flange 52. Each lug 82 carries a laterally inwardly extending pivot pin 84 at its upper end which is received within a cylindrical opening in an associated side member 74. Each lug 82 is recessed into a flange 52 and is received within a generally complementary recess in a side member 74 so that the outwardly facing surfaces of the flange, the lug and the associated side member lie substantially within the same plane, as best shown in FIG. 2.

Additional support for the structure 72 is provided by a pair of laterally spaced elongated generally rectangular longitudinally extending side plates 86, 86, each of which is fastened to an outer surface of a flange 52 and which extends upwardly therefrom adjacent a side member 74. The side plates 86, 86 aid to maintain the side members 74, 74 in vertical relationship and to prevent lateral movement or side sway thereof.

The lever system 80 also includes a pair of lugs 88, 88 which are generally similar to the lugs 84, 84 and which are recessed within and fastened to the base flanges 52, 52 and depend therefrom through the opening 44 in laterally spaced relationship and slightly rearwardly of the side members 74, 74. Each lug 88 carries a laterally inwardly directed pivot pin 90 which serves as a fulcrum for an elongated generally longitudinally rearwardly extending lever 92. Each lever 92 is operably connected with a side member 74 by a generally vertical extending link 94 which is pivotally connected to the lever in close association with the lever fulcrum. Each link 94 lies inwardly of a side plate 86 and within a recess in a flange 52 and is also recessed into and pivotally connected to the associated side member 74 proximate the lower rear corner thereof.

Power for operating the lever system 80 is provided by a pair of laterally spaced fluid motors or hydraulic cylinders 96, 96 of the double action type each of which includes a stationary part or cylinder 98 which is fixed relative to the machine frame 12 and a generally vertically reciprocating part or piston rod 100 which carries a yoke 102 which is in turn pivotally connected to an associated lever 92 at the forward extremity thereof.

To assure synchronous operation of the lever system 80 pivotal connection between the yokes 102, 102 and the respectively associated levers 92, 92 is provided by a single pivot pin 104 which extends laterally therebetween and which is retained against lateral movement relative thereto by a pair of collars 106, 106 each of which is spaced laterally inwardly of an associated yoke, as best shown in FIG. 2. The hydraulic cylinders 96, 96 are simultaneously operated by the aforementioned hydraulic pump and are controlled in a manner which will be hereinafter further discussed.

It should be evident from the foregoing description that the lever system 80 provides a means for inclining the work surfaces of the upper tool relative to the work surfaces of the lower one. It should also be noted that the lever system 80 cooperates with the tools to effect bending of the workpiece to a first position.

As previously noted an adjusting means is also provided for varying the angle of inclination between the tool work surfaces and for this reason the upper tool support member 76 is secured to the respectively associated side members 74, 74 by an adjusting mechanism indicated generally at 108. The adjusting mechanism generally comprises a pair of rear adjusting screws 110, 110 arranged for synchronous adjustment and a pair of generally similarly arranged forward adjusting screws 112, 112. Each rear screw 110 extends loosely downwardly through the support member 76 proximate a rear corner thereof to threadably engage an associated side member 74 and has a coaxially aligned worm wheel 114 pinned or otherwise suitably secured to its upper end. Each worm wheel includes a hub portion 116 which exerts a downward force on the support member 76. A rear shaft 118 carried by a pair of transversely spaced journal blocks which are fastened to the upper surface of the support member 76 in turn carries a pair of laterally spaced worm gears 120, 120 each of which intermeshes with associated worm wheel 114. An extending end portion of the rear shaft is adapted to receive a crank to facilitate adjustment.

The forward adjustment screws 112, 112 which are substantially identical to those aforedescribed carry a pair of worm wheels 122, 122 which cooperate in a similar manner with a pair of intermeshing worm gears 124, 124 carried by a forward shaft 126.

The adjusting mechanism 108 also includes a pair of rear compression springs 128, 128 each of which is received in a generally cylindrical downwardly opening recess in the support member 76 and spaced longitudinally forwardly of an associated screw 110. Each spring 128 projects downwardly from its recess and engages an associated side member 74 to bias the support member 76 upwardly therefrom. A pair of generally similarly constructed and arranged forward compression springs 130, 130 perform a similar function.

The machine 10 is preferably hydraulically operated and electrically controlled and may be arranged for single or continuous cycle operation. The hydraulic pump which supplies fluid under pressure to the hydraulic cylinders 62 and 96, 96 normally operates continuously while the machine is in operation, paths of fluid flow from the pump and through the various cylinders being determined by electrical solenoid operated control valves in a manner well known to those skilled in the art.

At the beginning of the straightening cycle the tools are in the position generally illustrated in FIG. 1.

When the machine is arranged for continuous cycle operation a workpiece W may be fed into position between the tools by an automatic feed device (not shown) which may, for example, comprise a track mechanism.

The machine cycle is started by activating a manually operated electrical control circuit which in turn activates a solenoid valve to supply fluid to the cylinder 62 which imparts forward motion to the lower tool 14.

As the lower tool 14 moves forwardly a finger 132 carried by the carriage 56 engages a microswitch 134 which activates the cylinders 96, 96 causing the piston rods 100, 100 to move generally downwardly to operate the lever system 80. The lever system in turn moves the upper tool 16 to an inclined position relative to the lower tool 14 and causes the workpiece W to be bent to the first position.

At its forwardmost or broken line position in FIG. 1 the carriage 56 engages a microswitch 136 which reverses the action of the hydraulic cylinders 96, 96 causing the tool 16 to move upwardly or away from its inclined position and which also reverses the action of the cylinder 60 causing the lower tool 14 to move toward its rearward position. Thus the microswitch 136, which may be arranged for adjustable positioning relative to the machine frame, provides a means for predetermining the longitudinal movement of the lower tool 14 and the duration of the machine cycle. A microswitch 138 positioned rearwardly of the switch 134 and in the path of rearwardly travel of the finger 132 is actuated by the said finger and causes the cylinder 62 to reverse its motion or to move forwardly to repeat the straightening cycle. The machine will continue to cycle automatically in the aforedescribed manner until the electrical control circuit is manually interrupted at which time the machine will complete its cycle and come to rest in the position indicated by full lines in FIG. 1.

The invention claimed is:

1. A machine for straightening elongated workpieces of generally circular cross section said machine comprising a first tool having two elongated parallel and laterally spaced work surfaces located substantially in the same plane and facing in the same direction for engaging one side of a workpiece, a second tool having a third elongated work surface located laterally between said first tool surfaces and spaced from and facing said first tool surfaces so as to engage the generally opposite side of said workpiece, and means for moving one of said tools relative to the other to move said surfaces in such a manner as to roll said workpiece therealong between first and second positions and so as to gradually increase the spacing between said first and second tool surfaces at the location of said workpiece, said tools being so arranged that in said first position the workpiece is held in a bowed condition between said two work surfaces by said third work surface.

2. A machine as set forth in claim 1 including a mechanism for inclining said third work surface relative to the plane of said two work surfaces and for causing the workpiece to assume said first position.

3. A machine as set forth in claim 2 wherein said mechanism comprises a lever system operatively connected to one of the said tools.

4. A machine as set forth in claim 2 including adjusting means for varying the angle of inclination between said third work surface and said two work surfaces.

5. A machine as set forth in claim 1 wherein said means includes power means for moving one of the said tools longitudinally relative to the other.

6. A machine as set forth in claim 5 including limit means for predetermining the longitudinal movement of said one tool.

7. A machine as set forth in claim 5 wherein said power means comprises a motor having a longitudinally reciprocally movable part operatively connected to said one tool and including a stationary part secured against longitudinal movement relative to said other tool.

8. A machine as set forth in claim 1 wherein the lateral spacing between said two work surfaces is substantially greater than the lateral dimension of said third work surface.

9. A machine as set forth in claim 1 wherein said two work surfaces and said third work surface each have a generally convex lateral cross-sectional contour.

10. A machine as set forth in claim 1 wherein said two work surfaces are respectively defined by two elongated parallel and laterally spaced ribs and wherein said first tool includes an elongated resilient pad substantially filling the space between said ribs and having a work supporting surface located substantially in said plane of said two work surfaces.

11. A machine as set forth in claim 10 wherein said pad is made from an elastomeric material.

12. A machine as set forth in claim 11 wherein said material includes longitudinally extending regions of varying hardness and being of greatest hardness proximate its marginal edge portions.

References Cited

UNITED STATES PATENTS

| | | | |
|---|---|---|---|
| 2,822,854 | 2/1958 | Berg | 72—385 |
| 2,930,877 | 3/1960 | Pelphrey | 72—88 |
| 3,051,216 | 8/1962 | Tomka | 72—385 |

CHARLES W. LANHAM, *Primary Examiner.*

G. P. CROSBY, *Assistant Examiner.*